Sept. 14, 1937.   R. A. WILLIAMS   2,093,396
ADJUSTABLE BRIDGE FOR EYEGLASSES
Filed March 30, 1936
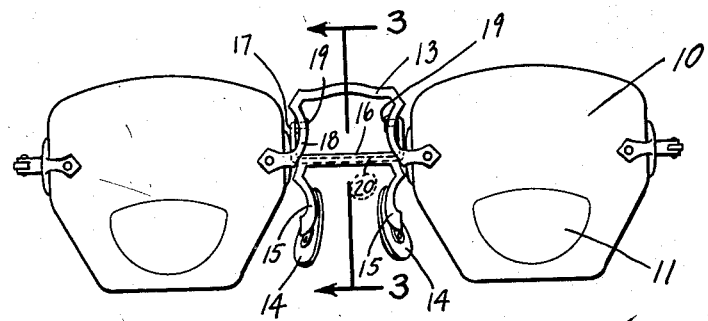
FIG. 1
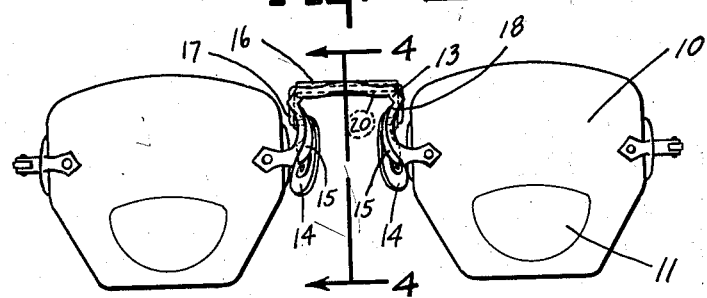
FIG. 2
FIG. 3   FIG. 4
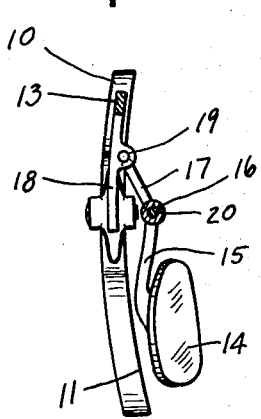
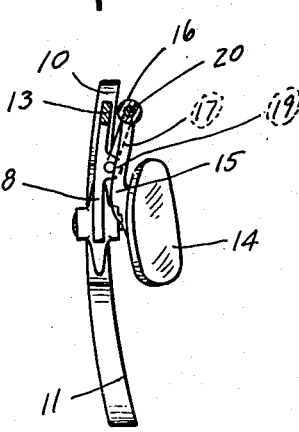
INVENTOR.
RICHARD A. WILLIAMS.
BY Lockwood Goldsmith & Galt
ATTORNEYS.

Patented Sept. 14, 1937

2,093,396

UNITED STATES PATENT OFFICE 2,093,396

ADJUSTABLE BRIDGE FOR EYEGLASSES

Richard A. Williams, Indianapolis, Ind.

Application March 30, 1936, Serial No. 71,568

2 Claims. (Cl. 88—49)

This invention relates to an adjustable bridge or nose piece for eyeglasses, and particularly for glasses employing bifocal lenses.

The purpose of the invention is to provide a sightly and convenient mounting for bifocal lenses, which will enable the wearer to adjust them whereby either the distant vision portions or the near vision portions thereof may be positioned in the direct line of vision.

It is well known that some wearers of bifocal lenses are inconvenienced in reading or otherwise using the near vision segments of the lens by reason of their being slightly below the direct line of vision which necessitates the user tilting his head back in an unnatural position.

It is the purpose of this invention, therefore, to so mount the lenses that they may be raised or lowered instead of the wearer changing his line of vision. In normal use, wherein the upper distant vision portion of the lens is employed, the usual mounting is satisfactory. When it is desired to use the lower near vision portion for reading or like purposes, the nose piece may be convieniently raised so as to elevate the near vision portion for bringing it into the direct line of vision.

The feature of the invention resides in providing such an adjustable nose piece as will not be noticeable when the lenses are in normal position and which may be readily changed to reading position. This is accomplished by mounting the usual type of nose piece upon the nose pads through the medium of a pivoted link such that when the link is swung over center to lowered position, the bridge portion of the lens mounting and of the nose pads are in alignment and the far vision portion of the lens is in the line of vision. When the link is swung over center to upper position, it carries the bridge of the lens mounting above the bridge of the nose piece so as to raise the lens and bring the near vision portion in the line of vision.

The full nature of the invention will be understood from the accompanying drawing and the following description and claims:

Fig. 1 is a front elevational view of the lenses in elevated position. Fig. 2 is the same as Fig. 1 showing them in lowered or normal position. Fig. 3 is a section taken on the line 3—3 of Fig. 1. Fig. 4 is a section taken on the line 4—4 of Fig. 2.

In the drawing there is illustrated a pair of bifocal lenses having a distant vision portion 10 and a near vision portion 11. Said lenses are mounted in the usual manner upon a lens bridge 13 of the usual character.

The usual nose pads 14, instead of being directly mounted upon the lens supporting bridge, are mounted upon a tubular auxiliary bridge comprising the arms 15, tubular bridge piece 16 and pivoted connecting link 17. The link 17 is in the form of a U-shaped wire or rod having its ends pivotally connected with the uprights 18 of the bridge 13 at 19, the horizontal or cross portion of the link 17 being indicated at 20 and extending through the tubular bridge piece 16.

In operation and use, pads 14 engage the bridge of the nose in the usual manner and support the auxiliary bridge piece 16 which in turn supports the bridge piece 13 to which the lenses are secured. When the lenses are in lowered position, the link 17 extends downwardly from the bridge piece 16 and supports the bridge piece 13 in alignment therewith so that the former is hidden from view as illustrated in Figs. 2 and 4. This is the normal position of the lenses with the distant vision portion in the line of vision.

When it is desired to use the lenses for reading purposes, the bridge pieces 13 and 16 are grasped between the thumb and forefinger and while the nose pads are held in position by the bridge piece 16, the bridge piece 13 is moved outwardly and upwardly until the link 17 passes over center as illustrated in Figs. 1 and 3. In this position the near vision portions of the lenses are brought into the direct line of vision.

In a like manner, the lenses may be returned to normal position by again moving the bridge piece 13 forwardly and downwardly so that the link 17 again passes over center to its lower position. Any suitable means may be employed for holding the bridge pieces and link in adjusted position.

Thus, it will be noted that by a pivotal swinging movement the lenses may be changed from one position to the other and in normal position the two bridge pieces will be in alignment, one behind the other so as to not detract from the usual appearance, their separation only being noticeable when in reading position.

The invention claimed is:

1. An adjustable bridge for eyeglasses comprising a bridge piece to which the lenses are secured, a tubular bridge piece to which the nose pads are secured, and a U-shaped link connection between said bridge pieces, the cross bar of said connection extending through the tubular bridge piece and the free ends of said connection being pivotally secured to the first-mentioned bridge piece, whereby upon movement of said link connection above center the lenses will be supported in upper position and upon movement of said link connection below center said lenses will be in lowered position with the bridge pieces in alignment.

2. An adjustable bridge for eyeglasses comprising a member to which the lenses are secured, a nose-engaging and supporting structure having a tubular cross piece, and a U-shaped link connection between said member and supporting structure, the cross bar of said U-shaped link extending through said tubular cross piece, and means for pivotally connecting the free ends thereof to said member, whereby, upon movement of said link connection above said cross piece, the lenses will be supported in the upper position and upon movement thereof below said cross piece, said lenses will be in the lower position with said member and structure in alignment.

RICHARD A. WILLIAMS.